Oct. 10, 1961     A. C. HOMEYER ET AL     3,003,519

FLUID CONTROL DEVICES

Original Filed Aug. 3, 1953     2 Sheets-Sheet 1

INVENTORS
ARTHUR C. HOMEYER
FREDERICK C. KRAMER
BY

ATTORNEY

Oct. 10, 1961   A. C. HOMEYER ET AL   3,003,519
FLUID CONTROL DEVICES

Original Filed Aug. 3, 1953   2 Sheets-Sheet 2

INVENTORS
ARTHUR C. HOMEYER
FREDERICK C. KRAMER
BY
A. J. Nydick
ATTORNEY

United States Patent Office 3,003,519
Patented Oct. 10, 1961

3,003,519
FLUID CONTROL DEVICES
Arthur C. Homeyer, Fells Road, Essex Fells, N.J., and Frederick C. Kramer, Queens Village, N.Y.; said Kramer assignor to said Homeyer
Continuation of application Ser. No. 372,086, Aug. 3, 1953. This application May 21, 1959, Ser. No. 816,359
3 Claims. (Cl. 137—454.6)

This invention relates to fluid distribution systems; and in particular is directed to improvements in the valving members thereof.

When the valve members of fluid distribution systems require repair, it has been necessary heretofore either to remove the entire valve from the system and replace it by a new member, or to disassemble the valves in situ, examine the same and replace the parts which have become worn away or become broken. Such methods of repairing or replacing defective valves entail considerable time with correlative high labor costs.

In installations where the valves are constantly subjected to use, as for example, in dispensing water coolers, faucets and the like, the maintenance or replacement of the valves is very expensive. In the case of water dispensers, either when owned outright by the user thereof or installed by a service rental firm, they are either examined periodically or serviced by a repair man who is summoned to attend to a defective condition. The repair or replacement of the valves in such devices is an expensive item.

In studying the problem of finding a means for drastically reducing the expense entailed in maintaining water dispensers, faucets, etc. in continuing operation, it occurred to us that a possible solution might lay in providing a valving mechanism in which a readily replaceable fluid control unit could be disposed within a housing or body so that such a unit could readily be inserted or removed from the permanently installed housing. In other words, to provide a fluid distribution system containing a housing member adapted to receive a unit containing the valving mechanism proper which could be "dropped in" somewhat as a cartridge or removed in a minimum of time. If such a method or means were possible of achievement, then the service man could remove a defective unit, replace the same with a new one (or a rebuilt one in good condition) and take the withdrawn one back to the shop where it could be examined, repaired or rebuilt. By means of such an operation the time of the service man or plumber consumed in remedying a defective valve condition would be held to a minimum with a concomitant drastic reduction in the expense. We found that such a unit could be constructed and when placed in the liquid distribution system would provide the advantages hereinabove indicated.

Accordingly, it is among the principal objects of this invention to provide a liquid distribution system wherein the valving mechanism comprises a housing adapted to receive a readily replaceable unit or cartridge that embodies the fluid control elements (or valve mechanism proper), such mechanism being actuated by appropriate means externally thereof which are connected with, linked to, or associated with the aforesaid housing.

A further principal object of this invention is to provide a valving mechanism in cartridge form which is adapted for use (by positioning in an appropriate housing) to form part of a fluid distribution system, thereby to provide for ready and rapid repair of the valving mechanism of said system.

A further object of this invention is to provide a member for use in the fluid control of a fluid distribution system comprising a member having a cavity adapted to receive a replaceable valve unit wherein the member has a fluid inlet and fluid outlet ducts communicating with said cavity and means for securing a replaceable valve unit to be placed within said cavity.

A further object of this invention is to provide a fluid distribution system wherein is disposed a housing having a cavity adapted to receive a replaceable valve unit in cartridge form, the housing being provided with means for securing the said cartridge within the cavity of the housing.

A further object of this invention is the provision of a replaceable valve unit in cartridge form for fluid distribution systems wherein the cartridge comprises a cup having a fluid inlet duct and a fluid outlet duct, a duct piece within the cup, the duct of which communicates at one end with the aforesaid inlet duct and at the other end discharges into the cup, and a movable stirrup so positioned that an arm of the stirrup and the discharge end of said duct piece are maintained in fluid control relationship with each other.

The foregoing objects as well as other objects and advantages will become more apparent from the following detailed description of the invention taken in connection with the accompanying drawings wherein.

Figure 1:
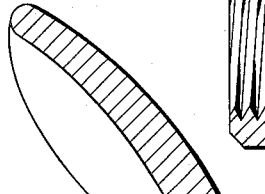
FIG. 1 is a vertical cross section of the dispensing head of a water cooler or fountain, showing the disposition therein of a valving member in the form of a cartridge made in accordance with this invention.
Figure 1:
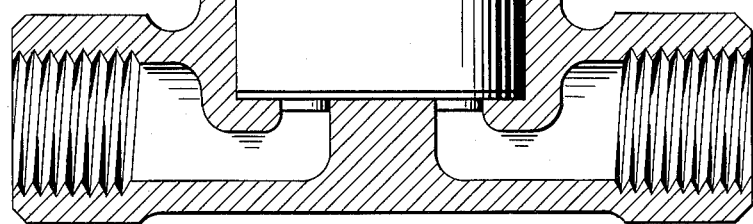
Figure 1:
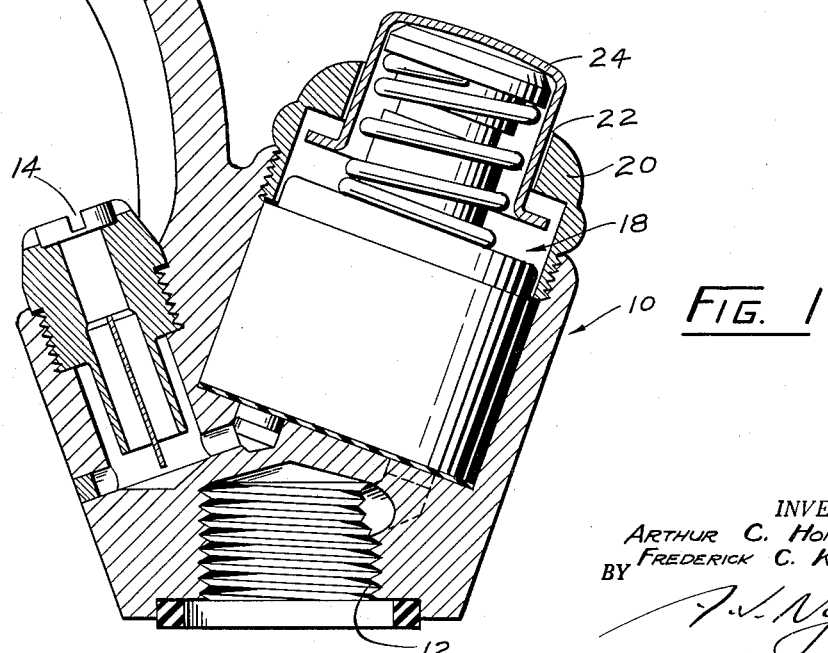

Referring to FIG. 1, the numeral 10 designates the dispensing head of a bubbling water dispenser of the "push-button" type. The head is adapted to connect with a water supply line by appropriate threaded engagement therewith, as by the threads 12. The water is delivered as at 14.

Set within an appropriate cavity is a valve unit designated generally as 18, the unit being held securely within the cavity by means of the nut 20. The nut 20 is provided with an orifice 22 which is adapted to receive the push-button 24 that rests upon a spring biased member of the valve unit. By pushing the button the valve unit is actuated so as to allow for the flow of the water through the valve so that it can be delivered in an appropriate stream through 14.

Figure 2:
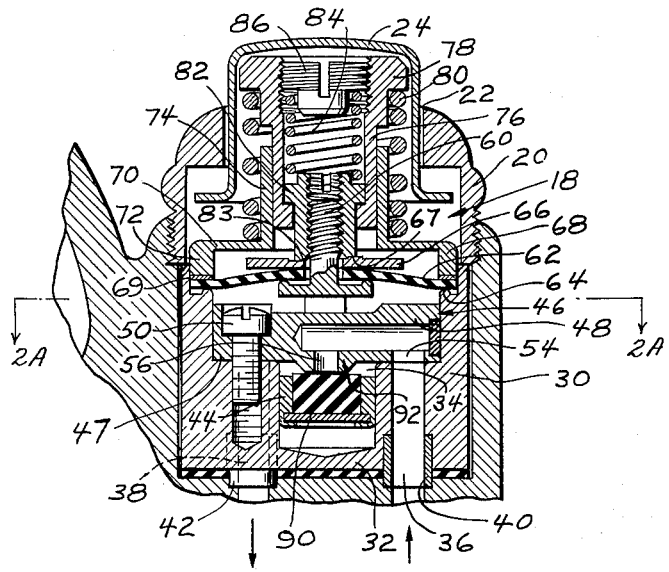
FIG. 2 is a fragmentary portion of the dispensing head illustrated in FIG. 1, showing in vertical section the details of construction of the valving cartridge, said valving cartridge being constructed to provide both "on and off" control of fluid and pressure regulation of the downstream flow.
Figure 2A:
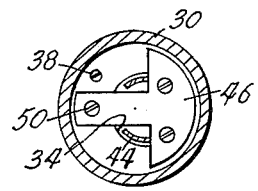
FIG. 2A is a fragmentary cross sectional view taken along line 2A—2A of FIG. 2.

The cartridge or valve unit as shown in detail in FIG. 2 comprises a cup 30 having a base 32 within which is an axially disposed recess or well 34. The base 32 is provided with two vertically disposed ducts or channels 36 and 38. The lower ends of each of these ducts may be allowed to receive snugly fitted tubes 40 and 42 respectively thereby providing inlet and outlet ports of the valve unit. A stirrup 44, adapted to move vertically, is set within the cup. A fluid duct piece or bridge member 46 of generally T-shaped configuration is so positioned that the vertical leg 47 thereof passes through the stirrup. The cross-bar 48 of piece 46 rests on the top of the base 32 and may be fastened thereto by means of screws. The free end of the vertical leg of the duct piece is affixed to the base by a screw as at 50. The duct piece 46 is provided with an internal duct to allow for the passage of fluid therethrough as by the horizontal duct section 52 and the vertical inlet duct section 54 and outlet duct section 56.

The stirrup member 44 is provided with an upwardly extending, externally threaded stem 60. A diaphragm 62 of appropriate water impermeable resilient material, as for example rubber or other suitable material, is seated peripherally on the shoulder 64 within the cup 30, the stem 60 extending through the diaphragm. The diaphragm may be covered by the lock disk 66, the upper face of which is serrated annularly in the area surrounding the stem 60, as at 67. There may be seated upon the periphery of the diaphragm a retainer ring 69. A housing guide 68 which comprises a cover plate 70, a downwardly extending rim or flange 72 and an axially disposed, upwardly extending tubular stem 74 is seated upon the diaphragm. A tubular spring housing 76, the upper end of which is flanged outwardly as at 78, is set within 74. A helical spring 80 surrounds the stem 74 and is engaged between the cover plate 70 and the flange 78. The spring housing 76 is secured to the stem 60 by the nut 82, the lower end of which is serrated as at 83 so as to engage the serrations 67. Set within the spring housing 76 is the helical spring 84 which is secured in position by means of the screw 86.

The base of the stirrup may be provided with a valve head of appropriate material, as at 90, which is adapted for the seating thereon of the beveled annular valve seat on the underface of the duct piece as at 92.

As shown in FIG. 2 the structure is in the "fully off" position, the valve head 90 being held against the annular seat 92. By depressing the push-button 78 against the biasing of spring 80, the stirrup is moved downwardly and the fluid begins to flow through the valve. The pressure on the downstream flow is regulated by appropriate adjustment of the pressure on the diaphragm through the setting of screws 82 and 86. While not noticeable in the drawing, yet it is advantageous to provide for the building up of pressure within the cup by making the outlet orifice or tube 42 slightly smaller than the controlling inlet orifice or duct 54. In that way pressure is built up within the cup and the diaphragm provides for maintaining the pressure at the desired level.

Figure 3:
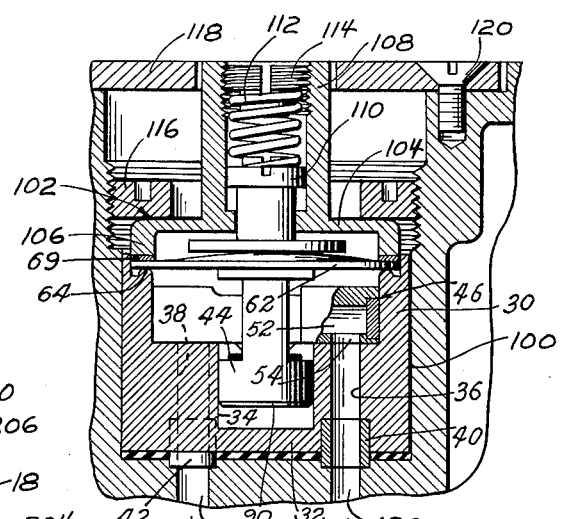
FIG. 3 is a vertical section of a valving cartridge of this invention shown set within a fragmentary portion of a housing therefor, said cartridge being constructed to provide a constant flow of fluid with the downstream flow thereof maintained under adjusted pressure regulation.

In FIG. 3 there is shown a valving cartridge substantially akin to that shown in FIG. 2, it being different from that of FIG. 2 in that it provides only for a constant flow of the fluid with the pressure thereof on the downstream side under the adjusted pressure regulation. The cavity for the reception of the cartridge is designated by the numeral 100. The cartridge comprises a cup 30 having a base 32 within which is an axially disposed recess or well 34. The base is provided with two vertically disposed ducts or channels 36 and 38. The lower ends of each of these ducts may be allowed to receive snugly fitted tubes 40 and 42 respectively thereby providing inlet and outlet ports of the valving unit. There is likewise provided a fluid duct piece 46 having an internal duct formed of sections 52 and 54 and an outlet section as in FIG. 2. The structure of the stirrup 44 and the valve head 90 are the same as are shown in FIG. 2. The diaphragm 62 is seated on the shoulder 64 as in FIG. 2; likewise the retainer ring 69. The housing guide 102 comprises a cover plate 104, a downwardly extending rim or flange 106 and an axially disposed upwardly extending tubular stem 108. The stem of the stirrup is secured by the nut 110, akin to the nut 82. Set within the stem is the helical spring 112, akin to spring 84, which is held in position by means of the screw 114, akin to the screw 86. The valve unit is secured within the housing by means of the threaded lock ring 116. A cover plate 118 is affixed to the housing as by the screw 120. As shown, the inlet and outlet orifices are in communication with the inlet and outlet ducts 130 and 132 respectively of the housing.

Figure 4:
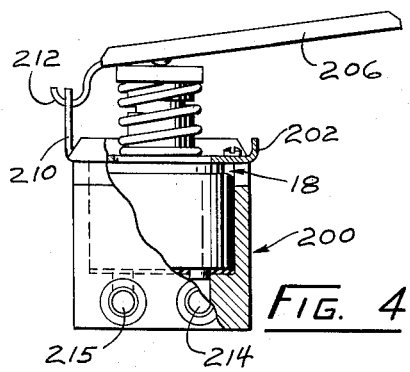
FIG. 4 is a diagrammatic representation in vertical section of another form of a fluid control structure embodying the replaceable valve unit illustrated in FIG. 2.

In FIG. 4 there is shown a modified arrangement for utilizing the cartridge valve unit of this invention. The valve unit designated by the numeral 18 is akin to the corresponding unit 18 shown in FIGS. 1 and 2. It is set within an appropriate housing 200 having a cavity adapted to receive the unit. The unit is secured in position by means of a cover plate 202. In place of the push-button 24 of FIGS. 1 and 2, the valve unit is actuated in this instance by means of the lever 206, one end of which is held in the bracket 210 by means of the engaging hook 212. The fluid inlet and fluid outlet orifices of the housing are designated by the numerals 214 and 215 respectively.

Figure 5:
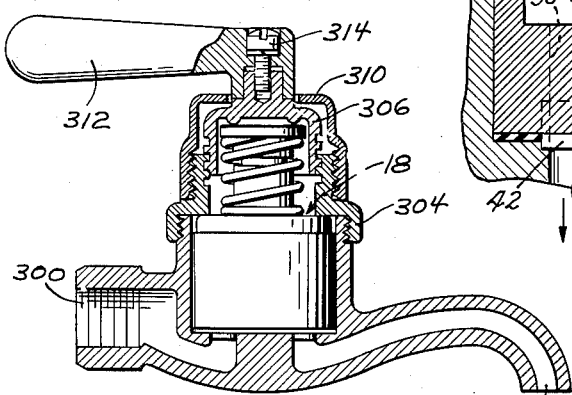
FIG. 5 is a diagrammatic representation, in cross section, of a water faucet which embodies the aforedescribed concept utilizing a replaceable valve unit.

In FIG. 5 there is shown a water faucet having a cavity adapted to receive a cartridge valve unit designated by the numeral 18 akin in construction to the corresponding valve unit illustrated in FIG. 2. The body of the faucet is provided with a fluid inlet as at 300 and a fluid outlet as at 302. The valve unit is secured within the body of this faucet by means of the bonnet nut 304, which bonnet nut engages the vertically movable threaded cap 306. The assemblage of bonnet nut 304 and cap 306 is enclosed by the external bonnet nut 310. The vertically movable cap 306 may be actuated by means of the handle 312 which is secured to the same by means such as a screw as at 314.

Figure 6:
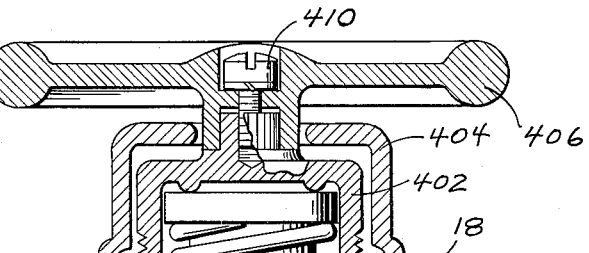
FIG. 6 is a diagrammatic representation, in cross section, of a globe value which embodies the aforedescribed concept utilizing a replaceable valve unit.

In FIG. 6 there is shown a globe valve in which the fluid control is achieved by means of a cartridge valve unit designated by the numeral 18 set within a cavity adapted to receive the same. The unit 18 is secured within the cavity by means of a flange 400 which flange engages the vertically movable threaded cap 402. The assemblage of the flange 400 and the cap 402 is enclosed by the external bonnet nut 404. The vertically movable cap 402 may be actuated by the wheel 406 which is secured to the same by means such as the screw 410.

This application is a continuation of application of Arthur C. Homeyer and Frederick C. Kramer, Serial No. 372,086, filed August 3, 1953, now abandoned.

It will be understood that the foregoing description of the invention and the embodiments shown are merely illustrative of the principles thereof; and, accordingly, that the appended claims are to be construed as defining the invention within the full spirit and scope thereof.

What is claimed is:

1. A replaceable valve unit for placement within a cavity of a housing comprising, in combination, a cup, a tubular element set on the bottom of said cup defining a well, a fluid inlet orifice and a fluid outlet orifice, the diameter of said fluid outlet orifice being smaller than the diameter of said fluid inlet orifice, a fluid duct piece set within said cup having a duct communicating at one end with said inlet orifice and at the opposite end with the interior of said cup, a stirrup completely and freely encircling said duct piece completely housed within said cup and movably disposed relative to the discharge end of said duct piece between an open and a closed position therewith, an extension on the bottom of said stirrup being slidably disposed in said well, a diaphragm covering said cup, a cover piece surmounting said diaphragm, said cover piece having an axially disposed tubular stem, a tubular member slidably disposed within said stem, said tubular member having an externally disposed outwardly extending flange, said stirrup terminating in a shaft extending through said diaphragm, means engaging the free end of said shaft disposed within the tubular member which is disposed within said tubular stem of said cover piece, a spring encircling said tubular stem seated at opposite ends between said flange and said cover piece urging said stirrup into closing engagement with said discharge end of said duct piece, and means associated with said stirrup for actuating said stirrup against the action of said spring.

2. A replaceable valve unit for fluid distribution systems comprising, in combination, a cup, a tubular element set on the bottom of said cup defining a well, an inlet duct and an outlet duct, a duct piece set within said cup, said duct piece having an internal duct communicating at one end with the aforesaid inlet duct and terminating at the other end in an annular valve seat, said valve seat being in spaced apart relationship and communicating with said outlet duct, a stirrup completely housed within said cup and freely encircling said duct piece, said stirrup having a base cap in facing relationship with said valve seat, said base cap being slidably disposed in said well for reciprocating movement in a direction normal thereto for controlling fluid flow through said valve seat, a diaphragm covering said cup, a cover piece surmounting said diaphragm, and spring means urging said stirrup base cap into closing engagement with said valve seat.

3. A replaceable valve unit for placement within a cavity of a housing forming a part of a fluid distribution system comprising, in combination, a cup having an imperforate cylindrical side wall and a base wall, a tubular element set on the bottom of said cup defining a well, and further defining an inlet orifice and an outlet orifice, a duct piece within said cup having one end communicating directly with said inlet orifice and an opposite end discharging directly into the interior of said cup, a stirrup wholly housed within said cup and completely encircling said duct piece for slidable reciprocating movement within said well relative to said opposite end of said piece between an open and a blocking position therewith for controlling fluid flow therethrough, a diaphragm covering said cup, a cover piece surmounting said diaphragm having an axially disposed tubular stem, said stirrup having a stem extending through said diaphragm and into the tubular stem of said cover piece, a spring seated upon said cover piece in encircling engagement with said tubular stem thereof, and said stem of said stirrup having flange means in abutment with the opposite end of said spring normally urging said stirrup toward said blocking position with said opposite end of said duct piece.

References Cited in the file of this patent
UNITED STATES PATENTS

| | | |
|---|---|---|
| 1,793,292 | Taylor | Feb. 17, 1931 |
| 1,961,439 | Ebinger | June 5, 1934 |
| 2,868,223 | Lum | Jan. 13, 1959 |